United States Patent
Malhotra et al.

(10) Patent No.: US 11,134,006 B2
(45) Date of Patent: Sep. 28, 2021

(54) LOOP CONFLICT AVOIDANCE IN A SPINE-AND-LEAF NETWORK TOPOLOGY

(71) Applicant: Arrcus Inc., San Jose, CA (US)

(72) Inventors: Neeraj Malhotra, Los Gatos, CA (US); Keyur Patel, San Jose, CA (US); Derek Man-Kit Yeung, Fremont, CA (US); Nalinaksh Pai, San Ramon, CA (US); Kalyani Rajaraman, San Jose, CA (US); Vikram Ragukumar, Pleasanton, CA (US)

(73) Assignee: ARRCUS INC., San Jose, CA (US)

( * ) Notice: Subject to any disclaimer, the term of this patent is extended or adjusted under 35 U.S.C. 154(b) by 0 days.

(21) Appl. No.: 16/549,752

(22) Filed: Aug. 23, 2019

(65) Prior Publication Data
US 2020/0067822 A1    Feb. 27, 2020

Related U.S. Application Data

(60) Provisional application No. 62/722,003, filed on Aug. 23, 2018.

(51) Int. Cl.
*H04L 12/707* (2013.01)
*H04L 12/723* (2013.01)
(Continued)

(52) U.S. Cl.
CPC .......... *H04L 45/22* (2013.01); *G06F 9/45558* (2013.01); *G06F 9/4881* (2013.01);
(Continued)

(58) Field of Classification Search
CPC ..... H04L 45/22; H04L 45/28; H04L 12/4645; H04L 47/125; H04L 47/12; H04L 45/24;
(Continued)

(56) References Cited

U.S. PATENT DOCUMENTS 6,879,594 B1    4/2005    Lee
7,593,320 B1    9/2009    Cohen
(Continued)

OTHER PUBLICATIONS

Husseman. "A Beginner's Guide to Understanding the Leaf-Spine Network Topology." In: West Monroe Partners. Mar. 23, 2015 (Mar. 23, 2015) Retrieved on Oct. 13, 2019 (Oct. 13, 2019) from <https://blog.westmonroepartners.com/a-beginners-guide-to-understanding-the-leaf-spine-network-topology/> entire document.
(Continued)

*Primary Examiner* — Ian N Moore
*Assistant Examiner* — Sun Jong Kim
(74) *Attorney, Agent, or Firm* — David R. Stevens; Stevens Law Group

(57) ABSTRACT

Systems, methods, and devices for routing operations in a network computing environment. A system includes a network topology comprising a plurality of spine nodes and a plurality of leaf nodes, wherein a link between a first spine node and a first leaf node is inactive. The first spine node includes one or more processors configurable to execute instructions stored in non-transitory computer readable storage media. The instructions include receiving a packet to be transmitted to the first leaf node. The instructions include identifying an alternative spine node at a same level in the network topology. The instructions include attaching a tunnel label to the packet, wherein the tunnel label indicates the packet should be transmitted to the alternative spine node.

17 Claims, 9 Drawing Sheets

Loop Avoidance: Via Backup Tunnel To Another Spine

(51) Int. Cl.
| | |
|---|---|
| *H04L 12/44* | (2006.01) |
| *H04L 12/46* | (2006.01) |
| *H04L 12/753* | (2013.01) |
| *G06F 16/27* | (2019.01) |
| *G06F 16/23* | (2019.01) |
| *G06F 16/22* | (2019.01) |
| *G06F 9/455* | (2018.01) |
| *H04L 12/66* | (2006.01) |
| *H04L 12/751* | (2013.01) |
| *H04L 12/721* | (2013.01) |
| *G06F 9/48* | (2006.01) |
| *H04L 12/703* | (2013.01) |
| *H04L 12/741* | (2013.01) |
| *H04L 12/803* | (2013.01) |
| *H04L 29/06* | (2006.01) |
| *H04L 12/28* | (2006.01) |
| *H04L 12/713* | (2013.01) |
| *H04L 29/08* | (2006.01) |
| *H04L 12/947* | (2013.01) |

(52) U.S. Cl.
CPC ...... *G06F 16/2272* (2019.01); *G06F 16/2379* (2019.01); *G06F 16/27* (2019.01); *G06F 16/278* (2019.01); *H04L 12/2881* (2013.01); *H04L 12/44* (2013.01); *H04L 12/462* (2013.01); *H04L 12/4633* (2013.01); *H04L 12/4641* (2013.01); *H04L 12/66* (2013.01); *H04L 45/02* (2013.01); *H04L 45/24* (2013.01); *H04L 45/26* (2013.01); *H04L 45/28* (2013.01); *H04L 45/48* (2013.01); *H04L 45/50* (2013.01); *H04L 45/586* (2013.01); *H04L 45/66* (2013.01); *H04L 45/745* (2013.01); *H04L 47/125* (2013.01); *H04L 63/0272* (2013.01); *H04L 67/1097* (2013.01); *H04L 67/26* (2013.01); *G06F 2009/45595* (2013.01); *H04L 49/25* (2013.01); *H04L 2012/4629* (2013.01)

(58) Field of Classification Search
CPC ..... H04L 45/50; H04L 12/4633; H04L 49/25; H04L 12/2859; H04L 12/4641; H04L 29/06068; H04L 29/06551
See application file for complete search history.

(56) References Cited

U.S. PATENT DOCUMENTS

| | | | |
|---|---|---|---|
| 7,970,918 B2 | 6/2011 | Thompson | |
| 8,060,533 B1 | 11/2011 | Wheeler | |
| 8,849,955 B2 | 9/2014 | Prahlad | |
| 9,330,154 B2 | 5/2016 | Di Vincenzo | |
| 9,331,940 B2 | 5/2016 | Lucent | |
| 9,544,185 B1* | 1/2017 | Yadav | H04L 41/0668 |
| 9,652,483 B1 | 5/2017 | Cao | |
| 2007/0074150 A1 | 3/2007 | Jolfael | |
| 2010/0046531 A1 | 2/2010 | Louati | |
| 2010/0189115 A1 | 7/2010 | Kitada | |
| 2010/0211781 A1 | 8/2010 | Auradkar | |
| 2012/0201124 A1* | 8/2012 | Marques | H04L 45/04 370/221 |
| 2012/0300782 A1 | 11/2012 | Farinacci | |
| 2013/0286846 A1 | 10/2013 | Atlas | |
| 2014/0044126 A1 | 2/2014 | Sabhanatarajan | |
| 2014/0092901 A1 | 4/2014 | Kapadia | |
| 2014/0207991 A1 | 7/2014 | Kaushik | |
| 2014/0258485 A1 | 9/2014 | Yang | |
| 2014/0366037 A1 | 12/2014 | Berretta | |
| 2015/0124590 A1* | 5/2015 | Chu | H04L 69/22 370/225 |
| 2015/0188808 A1 | 7/2015 | Ghanwani | |
| 2015/0195136 A1 | 7/2015 | Mermoud | |
| 2015/0263899 A1 | 9/2015 | Tubaltsev | |
| 2016/0028613 A1 | 1/2016 | Haramaty | |
| 2016/0065498 A1 | 3/2016 | Harper | |
| 2016/0112821 A1 | 4/2016 | Raleigh | |
| 2016/0142313 A1 | 5/2016 | Devireddy | |
| 2016/0294608 A1 | 10/2016 | Biswal | |
| 2016/0337231 A1 | 11/2016 | Dixon | |
| 2017/0041239 A1 | 2/2017 | Goldenberg | |
| 2017/0109369 A1 | 4/2017 | Feng | |
| 2017/0171057 A1 | 6/2017 | Dong | |
| 2018/0167475 A1 | 6/2018 | Agarwal | |
| 2019/0207844 A1* | 7/2019 | Kodavanty | H04L 41/20 |

OTHER PUBLICATIONS

Samman et al. "Multicash parallel pipeline router architecture for network-on-chip." In: Proceedings of the conference on Design, automation and test in Europe. Mar. 2008 (Mar. 2008) Retrieved on Oct. 18, 2019 (Oct. 18, 2019) from <https://www.researchgate.net/profile/Manfred_Glesner/publication/221340626_Multicast_Parallel_Pipeline_Router_Architecture_for_Network-on-Chip/links/02bfe50de0dc34c390000000/Multicast-Parallel-Pipeline-Router-Architecture-for-Network-on-Chip.pdf> entire document.

Wu et al. A new multi-channel MAC protocol with on-demand channel assignment for multi-hop mobile ad hoc networks. Dec. 9, 2000 (Dec. 9, 2000) Retrieved on Oct. 13, 2019 (Oct. 13, 2019) from <http://citeseerx.ist.psu.edu/viewdoc/download?doi=10.1.1.457.5412&rep=rep1&type=pdf> entire document.

* cited by examiner

Steady State Flow: P2 To P1 Flow

Possible Transient Loops On Link Failure: P2 To P1 Flow

Possible Transient Loops On Link Failure: P2 To P1 Flow

Loop Avoidance: Via Backup Tunnel To Another Spine

LOOP CONFLICT AVOIDANCE IN A SPINE-AND-LEAF NETWORK TOPOLOGY

CROSS-REFERENCE TO RELATED APPLICATIONS

This application claims priority to U.S. Provisional Patent Application Ser. No. 62/722,003 filed Aug. 23, 2018 titled "DATABASE SYSTEMS METHODS AND DEVICES," which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

TECHNICAL FIELD

The disclosure relates to computing networks and particularly relates to network topology and routing protocols in a computer networking environment.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding on the basis of routing tables which maintain a record of the routes to various network destinations. Routing tables may be specified by an administrator, learned by observing network traffic, or built with the assistance of routing protocols.

Small networks may use manually configured routing tables to determine how information should travel from one computer to another computer. A routing table may include a listing of "best paths" indicating the most efficient or most desirable paths between a starting computer and a final destination computer. Larger networks, including networks connected to the public Internet, may rely on complex topologies that can change rapidly such that the manual construction of routing tables is unfeasible. Dynamic routing attempts to solve this problem by constructing routing tables automatically based on information carried by routing protocols. Dynamic routing enables a network to act nearly autonomously in avoiding network failures and blockages. There exist multiple routing protocols that provide rules or instructions for determining best paths between networked device. Examples of dynamic routing protocols and algorithms include Routing Information Protocol (RIP), Open Shortest Path First (OSPF), Enhanced Interior Gateway routing Protocol (EIGRP), and Border Gateway Protocol (BGP).

In some instances, path selection involves applying a routing metric to multiple routes to select or predict the best route. Most routing algorithms use only one network path at a time. Multiple path routing techniques enable the use of multiple alternative paths. In computer networks, a routing algorithm may be used to predict the best path between two compute instances. The routing algorithm may be based on multiple factors such as bandwidth, network delay, hop count, path cost, load, maximum transfer unit, reliability, and communication cost. The routing table stores a listing of the best paths. A topological database may store a list of the best paths and may further store additional information.

In some networks, routing is complicated by the fact that no single entity is responsible for selecting best paths. Instead, multiple entities are involved in selecting best paths or event portions of a single path. In the context of computer networking over the Internet, the Internet is partitioned into autonomous systems (AS) such as Internet Service Providers (ISPs). Each autonomous system controls routes involving its network. Autonomous system-level paths are selected based on the Border Gateway Protocol (BGP). Each autonomous system-level path includes a sequence of autonomous systems through which packets of information flow to travel from one compute instance to another compute instance. Each autonomous system may have multiple paths from which to choose that are offered by neighboring autonomous systems.

There are numerous network topologies that have varying benefits and deficiencies for different computing applications. One network topology is the leaf-spine network topology that includes spine nodes in communication with multiple leaf nodes. Traditional routing protocols for a leaf-spine network topology have numerous deficiencies and can lead to ineffective data loops when a leaf node has gone inactive. There exists a desire for an improved labeling protocol and routing protocol for leaf-spine network topologies.

In light of the foregoing, disclosed herein are systems, methods, and devices for improved routing operations in a network computing environment.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
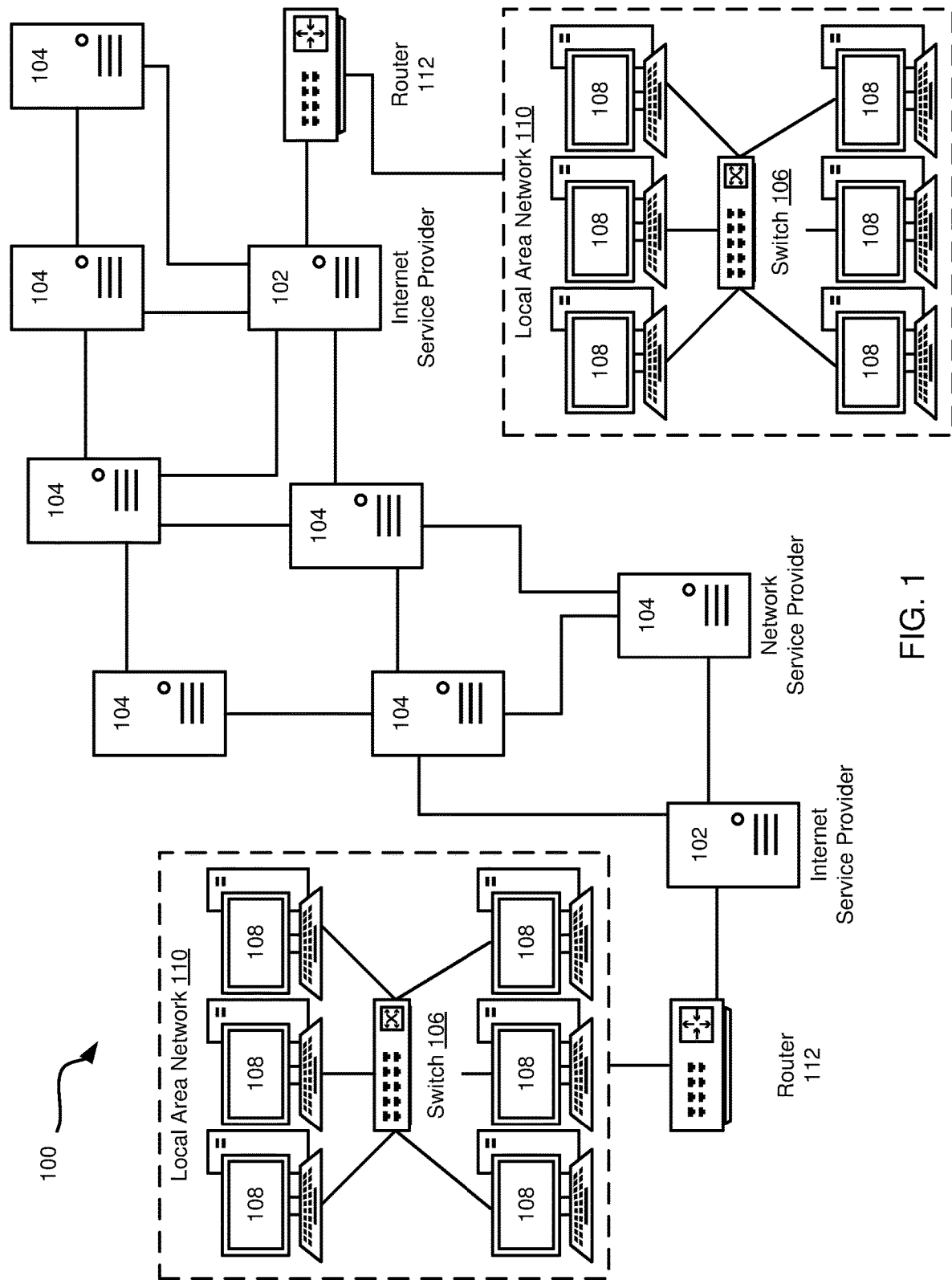
FIG. 1 is a schematic diagram of a system of networked devices communicating over the Internet.

Disclosed herein are systems, methods, and devices for improved network topology, routing labeling, and routing protocols in a network computing environment. An embodiment of the disclosure is deployed for avoiding a transient loop caused by an inactive link between a spine node and a leaf node in a leaf-spine network topology. An embodiment of the disclosure employs a backup tunnel to route a packet to a different spine to avoid a micro-loop that fails to transmit a data packet to its final destination.

In an embodiment, a leaf-spine network topology includes a plurality of spine nodes and a plurality of leaf nodes. Each of the plurality of spine nodes may operate as a networking device such as a switch or a router. Each of the plurality of leaf nodes may operate as a networking "destination" or "source" such as a consumer electronics device. The spine nodes may be configured for routing data packets throughout the network topology to the appropriate leaf nodes. In an embodiment, a link between a spine node and a leaf node is broken. Because the link is broken, a data packet being forwarded through the spine node could get trapped in a transient loop and not be transmitted to its destination the leaf node. Disclosed herein are systems, methods, and devices for loop avoidance by generating a backup tunnel to a different spine node.

In an embodiment, a spine node within the leaf-spine topology advertises that its link to a certain leaf node is broken. In the event the spine node needs to transmit a data packet to the certain leaf node, the spine node attaches a tunnel label to the data packet. The tunnel label is different from a regular and indicates an alternative route for the data packet to travel to eventually arrive at the certain leaf node. The tunnel label provides an alternate path via another spine node in the same level of the leaf-spine topology that as an active link to the certain leaf node. The tunnel label may further include an indication that the route is not the best path to the certain leaf node. The tunnel label is a label allocated by a leaf node for one of the spine nodes and is hence read by a leaf node such that such that the leaf node transmits the data packet to the alternative spine node in lieu of performing a lookup on the prefix pointing to the certain leaf node.

In a computer network environment, a networking device such as a switch or router may be used to transmit information from one destination to a final destination. In an embodiment, a data package and a message may be generated at a first location such as computer within a person's home. The data package and the message could be generated from the person interacting with a web browser and requesting information from or providing information to a remote server accessible over the Internet. In an example, the data package and the message could be information the person input into a form accessible on a webpage connected to the Internet. The data package and the message may need to be transmitted to the remote server that may be geographically located very far from the person's computer. It is very likely that there is no direct communication between the router at the person's home and the remote server. Therefore, the data package and the message must travel by "hopping" to different networking devices until reaching the final destination at the remote server. The router at the person's home must determine a route for transmitting the data package and the message thru multiple different devices connected to the Internet until the data package and the message reach the final destination at the remote server.

The processes of determining a best bath from a first location to a final destination and forwarding data packages and messages to a next destination are significant functions performed by a networking device such as a switch or router. The connections between networking devices in a network is referred to as the network topology. Network topology is the arrangement of elements such as links and nodes in a communication network. A network topology may include wired links, wireless links, or a combination of wired and wireless links between nodes in the network. Some examples of wired links include coaxial cables, telephone lines, power lines, ribbon cables, optical fibers, and so forth. Some examples of wireless links include satellites, cellular signals, radio signals, free-space optical communication, and so forth. The network topology includes an indication of all nodes in the network (e.g. computers, routers, switches, and other devices) and an indication of the linkages between nodes. Disclosed herein are systems, methods, and devices for improving network topology and network routing.

For purposes of furthering understanding of the disclosure, some explanation will be provided for numerous networking computing devices and protocols.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A customer edge router (CE router) is a router located on the customer premises that provides an interface between the customer's LAN and the provider's core network. CE routers, provider routers, and provider edge routers are components in a multiprotocol label switching architecture. Provider routers are located in the core of the provider's or carrier's network. Provider edge routers sit at the edge of the network. Customer edge routers connect to provider edge routers and provider edge routers connect to other provider edge routers over provider routers.

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its final destination. The routing table may further include quality of service associate with the route, links to filtering criteria lists associated with the route, interface for an Ethernet card, and so forth.

For purposes of illustrating the concept of a routing table, the routing table may be analogized to using a map for delivering a package. A routing table is similar to the use of a map for delivering a package to its final destination. When a node needs to send data to another node on a network, the node must first know where to send the data. If the node cannot directly connect to the destination node, the node must send the data to other nodes along a proper route to the destination node. Most nodes do not try to figure out which routes might work. Instead, a node will send an IP packet to a gateway in the LAN, which then decides how to route the data to the correct destination. Each gateway will need to keep track of which way to deliver various packages of data, and for this it uses a routing table. A routing table is a database that keeps track of paths, like a map, and uses these paths to determine which way to forward traffic. Gateways can also share the contents of their routing table with other nodes requesting the information.

For hop-by-hop routing, each routing table lists, for all reachable destinations, the address of the next device along the path to that destination, i.e. the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

The Open Systems Interconnection (OSI) model is a conceptual model that characterizes and standardizes the communication functions of a computing system without regard to its underlying internal structure and technology. The goal of the OSI model is the interoperability of diverse communication systems with standard communication protocols. The OSI model partitions a communication system into abstraction layers. A layer serves the layer above it and is served by the layer below. For example, a layer that provides error-free communications across a network provides the path needed by applications above it, while it calls the next lower layer to send and receive packets that constitute the contents of that path. Two instances at the same layer are visualized as connected by a horizontal connection in that layer. Communication protocols enable an entity in one host to interact with a corresponding entity at the same layer in another host. Service definitions, like the OSI model, abstractly describe the functionality provided to an (N)-layer by an (N−1)-layer, wherein N is one of the layers of protocols operating in the local host.

Route control is a type of network management that aims to improve Internet connectivity and reduce bandwidth cost and overall internetwork operations. Some route control services include a suite of hardware-based and software-based products and services that work together to improve overall Internet performance and finetune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause sever availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with he lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

Equal cost multipath (ECMP) routing is a routing strategy where next-hop packet forwarding to a single destination can occur over multiple "best paths." The multiple best paths are equivalent based on routing metric calculations. Multiple path routing can be used in conjunction with many routing protocols because routing is a per-hop decision limited to a single router. Multiple path routing can substantially increase bandwidth by load-balancing traffic over multiple paths. However, there are numerous issues known with ECMP routing when the strategy is deployed in practice. Disclosed herein are systems, methods, and devices for improved ECMP routing.

A Clos network can be deployed in telecommunications. A Clos network is a multistage circuit-switching network that represents an idealization of multistage switching systems. A Clos network includes three stages, including the ingress stage, the middle stage, and the egress stage. Each stage is made up of a number of crossbar switches. Each cell enters an ingress crossbar switch that can be routed through any of the available middle stage crossbar switches to the relevant egress crossbar switch. A middle stage crossbar is available for a particular new call if both the link connecting the ingress switch to the middle stage switch, and the link connecting the middle stage switch to the egress switch, are free.

A leaf-spine network topology can be deployed for connecting nodes in a computer network. The leaf-spine topology has two layers, including the leaf layer and the spine layer. The leaf layer consists of access switches that connect to devices like servers, firewalls, load balancers, and edge routers. The spine layer is made up of switches that perform routing and forms the backbone of the network where every leaf switch is interconnected with each spine switch. In a leaf-spine topology, all devices are located the same number of links away from each other and include a predictable and consistent amount of delay or latency for transmitting information.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for tracking the life cycle of objects in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet. The system 100 includes multiple local area network 160 connected by a switch 106. Each of the multiple local area networks 160 can be connected to each other over the public Internet by way of a router 162. In the example system 100 illustrated in FIG. 1, there are two local area networks 160. However, it should be appreciated that there may be many local area networks 160 connected to one another over the public Internet. Each local area network 160 includes multiple computing devices 108 connected to each other by way of a switch 106. The multiple computing devices 108 may include, for example, desktop computers, laptops, printers, servers, and so forth. The local area network 160 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 160 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all of the functions normally performed by a router. However, some network switches are limited to supporting a single type of physical network, typically Ethernet, whereas a router may support different kinds of physical networks on different ports.

The router 162 is a networking device that forwards data packets between computer networks. In the example system 100 shown in FIG. 1, the routers 162 are forwarding data packets between local area networks 160. However, the router 162 is not necessarily applied to forwarding data packets between local area networks 160 and may be used for forwarding data packets between wide area networks and so forth. The router 162 performs traffic direction functions on the Internet. The router 162 may have interfaces for different types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be appreciated that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. In light of the foregoing, disclosed herein are systems, methods, and devices for offloading best path computations to an external device to enable greater customizability in determining a best path algorithm that is well suited to a certain grouping of computers or a certain enterprise.

Figure 2:
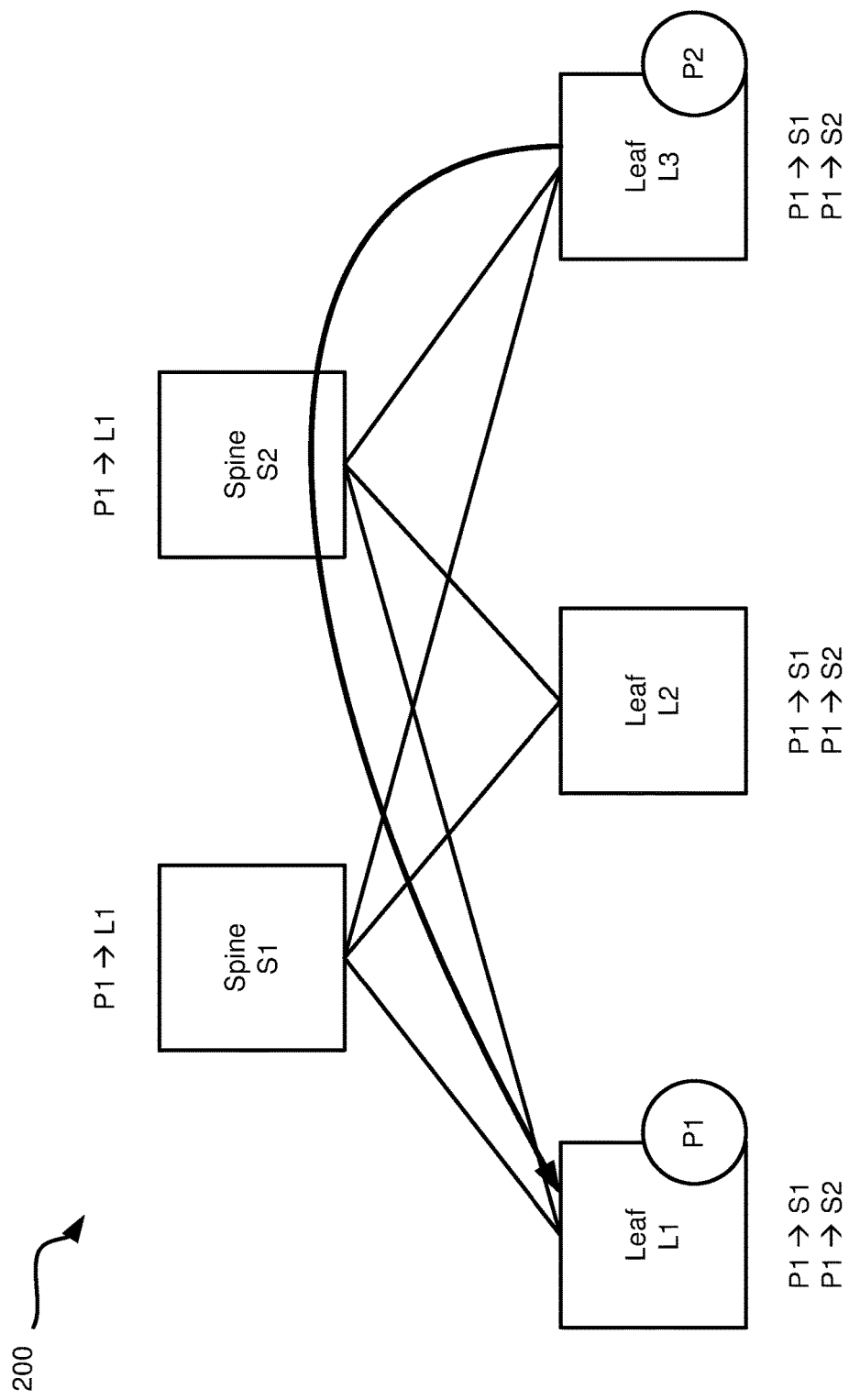
FIG. 2 is a schematic diagram of a leaf-spine network topology and a path for transmitting a packet from prefix P2 to prefix P1.

FIG. 2 is a schematic diagram of an example topology 200 illustrating a stead state flow from one networking prefix to another networking prefix. The topology 200 has a leaf-spine architecture. The topology 200 includes two spine nodes S1 and S2 and further includes three leaf nodes L1, L2, and L3. In a leaf-spine topology, all devices S1, S2, L1, L2, L3 are the same number of segments away. This is possible because the topology 800 only has two layers, include the spine layer and the leaf layer. The leaf layer L1, L2, L3 consists of access switches that connect to devices like servers, firewalls, load balancers, and edge routers. The spine layer S1, S2 is made up of switches that perform routing and serves as the backbone of the network where every leaf L1, L2, L3 switch is interconnected with each spine S1, S2 switch.

In the topology 200, prefix P1 is routed to leaf L1 and prefix p2 is routed to leaf L3. FIG. 2 illustrates an example steady state flow from prefix P2 to prefix P1. In the topology 200, each of the spines S1 and S2 is configured to route a data packet with prefix P1 to the leaf L1. Further, each of the leaf nodes L1, L2, and L3 is configured to route a data packet with prefix P1 to spine S1 or spine S2. In the example illustrated in FIG. 2, a data packet originates at leaf L3 and is subsequently routed to spine S2 and then to leaf L1.

Figure 3A:
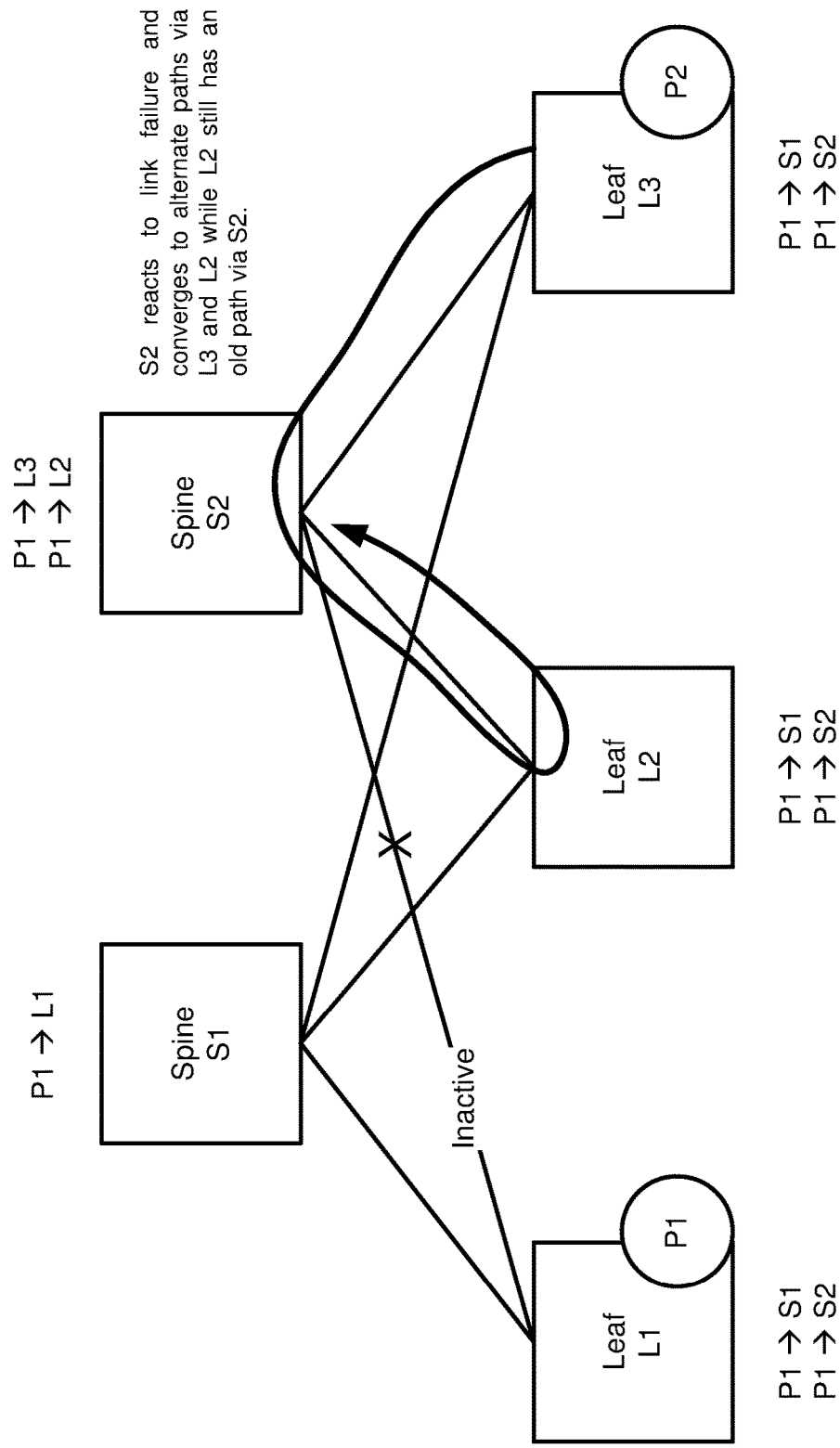
FIGS. 3A and 3B are schematic diagrams of a leaf-spine network topology and a possible transient loop caused by a link failure between spine S2 and leaf L1.
Figure 3B:
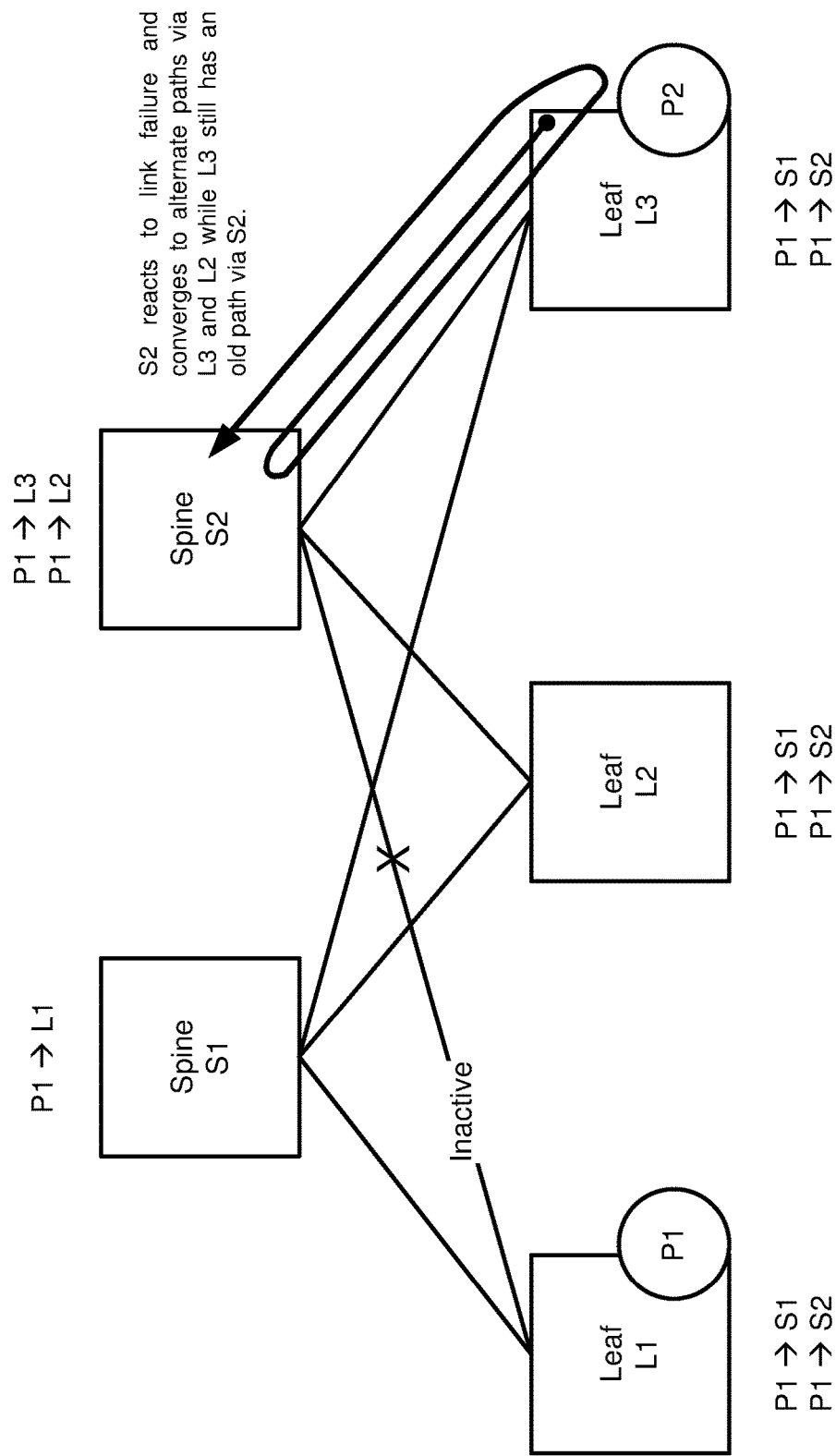

FIGS. 3A and 3B illustrate possible transient loops due to a link failure. In the examples illustrated in FIGS. 3A and 3B, the failed link is the link between spine S2 and leaf L1. In each of the possible transient loops, spine S2 reacts to the link failure and converges to alternate paths by way of leaf nodes L2 and L3. Leaf nodes L2 and L3 each still have an old path thru spine S2, and this can cause a micro-loop.

In the example illustrated in FIG. 3A, the data packet is transmitted from leaf L3 to spine S2 and is then sent to leaf L2 due to the failure of the link between spine S2 and leaf L1. The data packet is then sent back to spine S2 and this causes a micro-loop.

In the example illustrated in FIG. 3B, the data packet is transmitted from leaf L3 to spine S2 and is then sent back to leaf 13 due to the failure of the link between spine S2 and leaf L1. The data packet is then sent back to spine S2 and this causes a micro-loop.

Control plan driven convergence relies on the affected spine to withdraw prefixes learnt from the affected leaf. Traffic flows to prefixes behind the affected leaf converge by way of the remaining spines. Micro-loops are possible based on the control plane convergence illustrated in FIGS. 2, 3A, and 3B. One solution for loop avoidance in a leaf-spine architecture is illustrated in FIG. 4.

Figure 4:
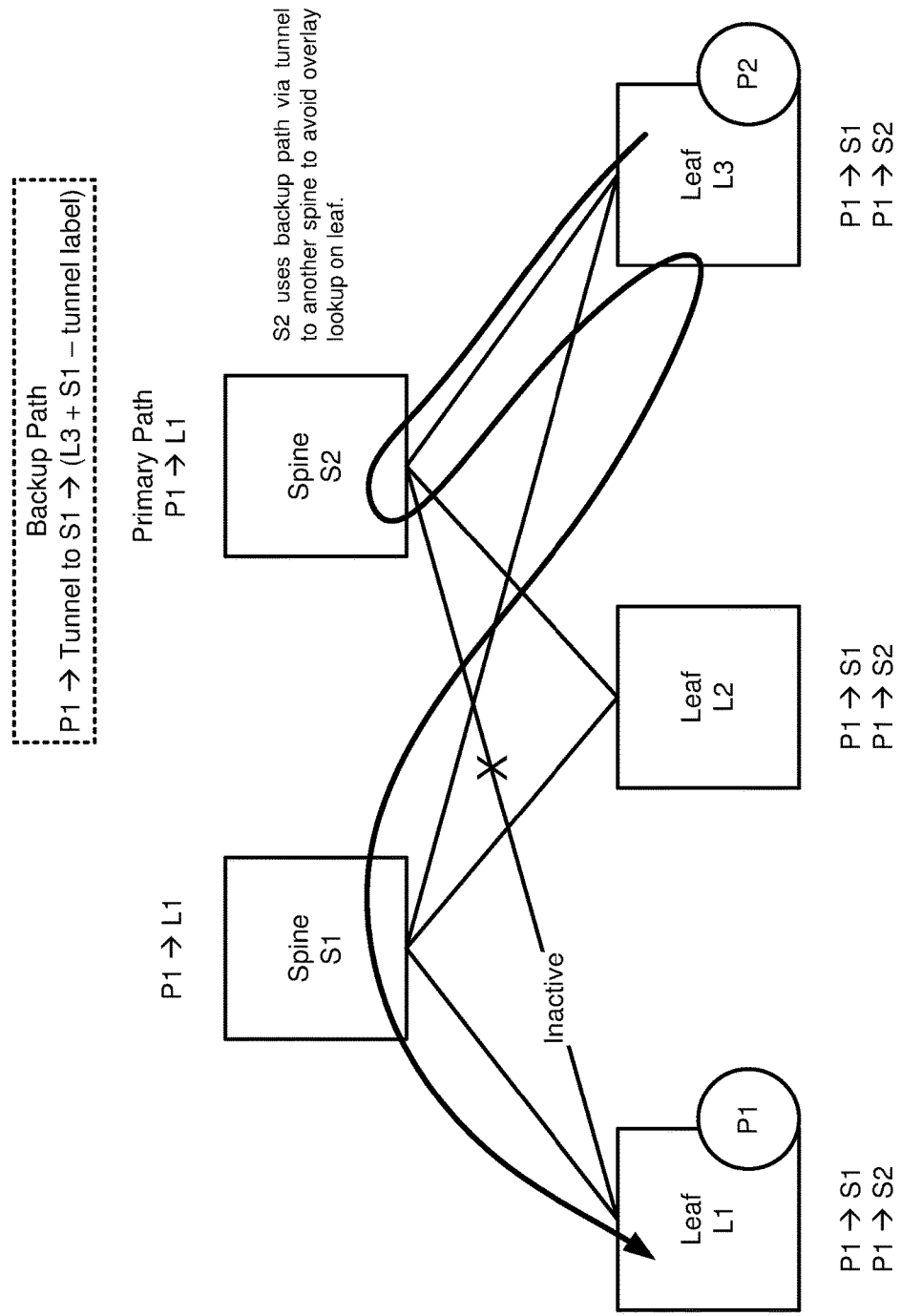
FIG. 4 is a schematic diagram of a leaf-spine network topology and a loop avoidance protocol for routing a packet by way of a backup tunnel to a different spine node.

FIG. 4 illustrates an example of loop avoidance by way of a backup tunnel to a different spine node. In this implementation, spine S2 uses a backup path by tunneling to a different spine (in this example, spine S1) to avoid overlay lookup on the leaf node. The backup path orders a data packet with prefix P1 to tunnel to spine S1 with a tunnel label. The tunnel label causes the data packet to be sent from leaf L3 to spine S1 rather than back to spine S2. Leaf L3 forwards the data packet on the tunnel label to spine S1 rather than performing a lookup on the prefix P1. When the data packet arrives at spine S1, the data packet can then be sent to its destination at leaf L1.

On a leaf link failure, such as failure of the link connecting spine S2 and leaf L1, a spine node may reroute thru a backup tunnel to one of the other spine nodes within its redundancy group. For example, a spine node such as spine S2 may configure or discover a redundancy group at each spine level. Each spine level is comprised of all other spines at the same level in the leaf-spine Clos architecture. The spine nodes advertise a local loopback route with a "level/ RG-ID" as a transitive attribute to signal that the spine nodes are part of a given redundancy group or level. The spine nodes advertise their local loopback routes to each of the leaf nodes to each of the leaf nodes. Further, leaf nodes associate a per-CE label with each received spine loopback route and advertise it further to other spine nodes. The spine node (in this case, spine S2) populates a redundancy group comprised of the available spine nodes. For each leaf next-hop, the spine node pre-programs a recursive backup path thru a tunnel to a backup spine with the received label as the tunnel label.

Figure 5:
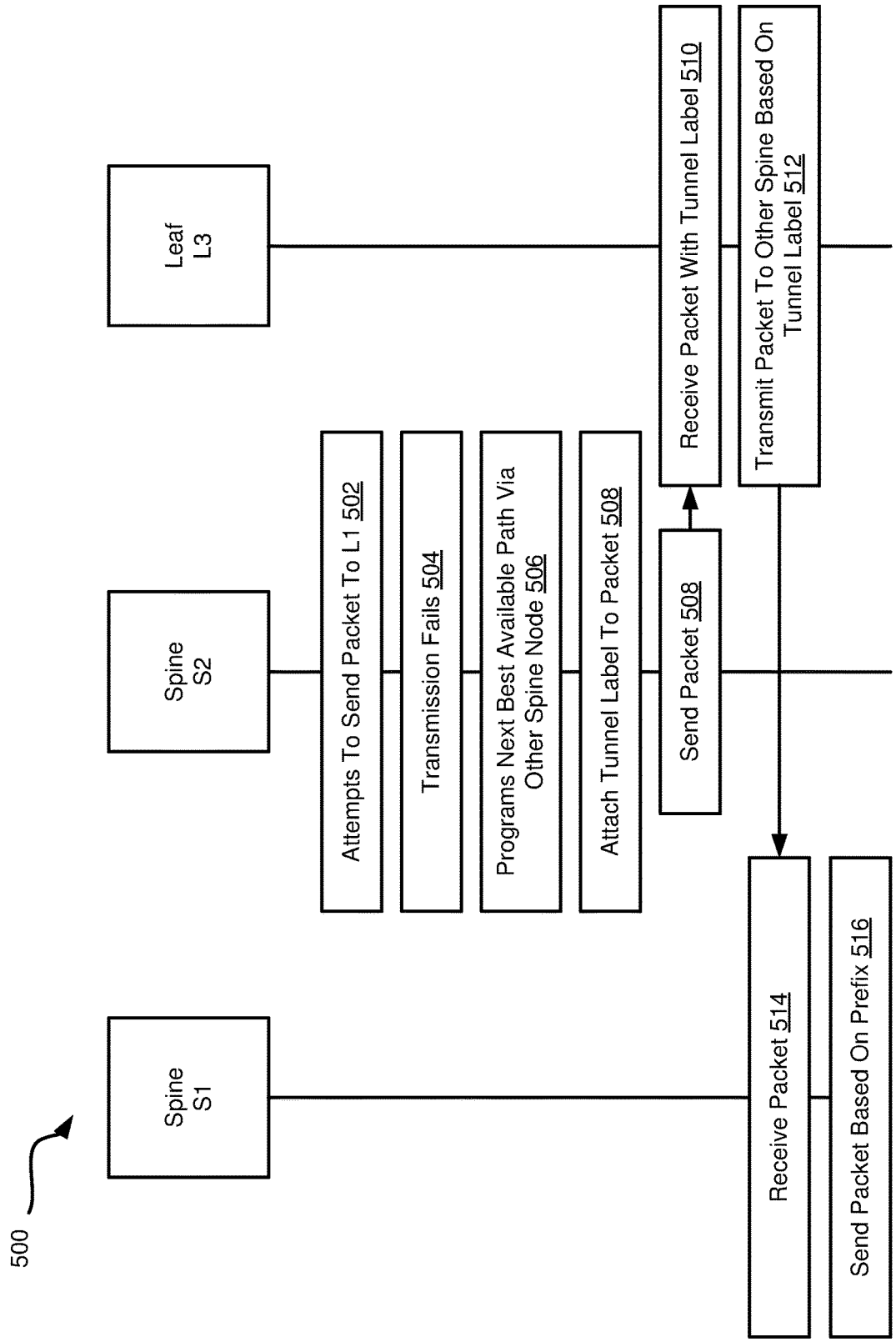
FIG. 5 is a schematic diagram of a process flow for rerouting a packet to a different spine node.

FIG. 5 is a schematic diagram of a process flow 500 for loop conflict avoidance. The process flow 500 may be implemented in a two-level leaf-spine architecture and may specifically be implemented in a Clos datacenter architecture. To promote ease of understanding the process flow 500, the process flow is performed by the same spine S1, spine S2, and leaf L3 as those illustrated in FIG. 4.

In the process flow 500, spine S2 receives a packet having prefix P1. In the topology illustrated in FIG. 4, prefix P1 is reachable behind leaf L1. In steady state, spine S2 normally transmits the packet that matches prefix P1 directly to leaf L1.

The spine S2 receives at 504 an indication that the link between spine S1 and leaf L1 is broken. Spine S2 immediately activates a pre-programmed backup path at 506 the next best available path by way of a different spine in the same level in the leaf-spine network topology. Spine S2 attaches at 508 a tunnel label to the packet. The tunnel label is attached in lieu of a regular label. Spine S2 sends the packet to leaf L3 at 508. Leaf L3 receives the packet with the tunnel label at 510. Leaf L3 transmits at 512 the packet to a different spine based on the tunnel label. Further to the implementation illustrated in FIG. 4, spine S1 receives the packet at 514. Spine S1 transmits the packet to a leaf based on the prefix at 516, and in this case spine S1 would transmit the packet to leaf L1.

In an embodiment, creation of the tunnel label is triggered by a spine node advertising its own loopback. There may be a special identifier for advertising a spine node lookup. In an embodiment, the spine nodes learn prefixes from the leaf nodes and can reprogram the spine nodes based on an advertised loopback.

The systems, methods, and devices disclosed herein may leverage the use of other spine nodes when a prefix cannot be reach by way of the best path. In the example shown in FIG. 4, the best path for spine S2 to reach prefix P1 is by transmitting a packet directly to leaf L1. However, the link between spine S2 and leaf L1 is broken. Therefore, spine S2 can leverage the use of another spine within the same level (in this case, spine S1) to send the packet to prefix P1 accessible behind leaf L1. This path is longer and is not the best path. However, this path provides a means to send the packet in a loop-free manner even when the link between spine S2 and leaf L1 is broken.

Figure 6:
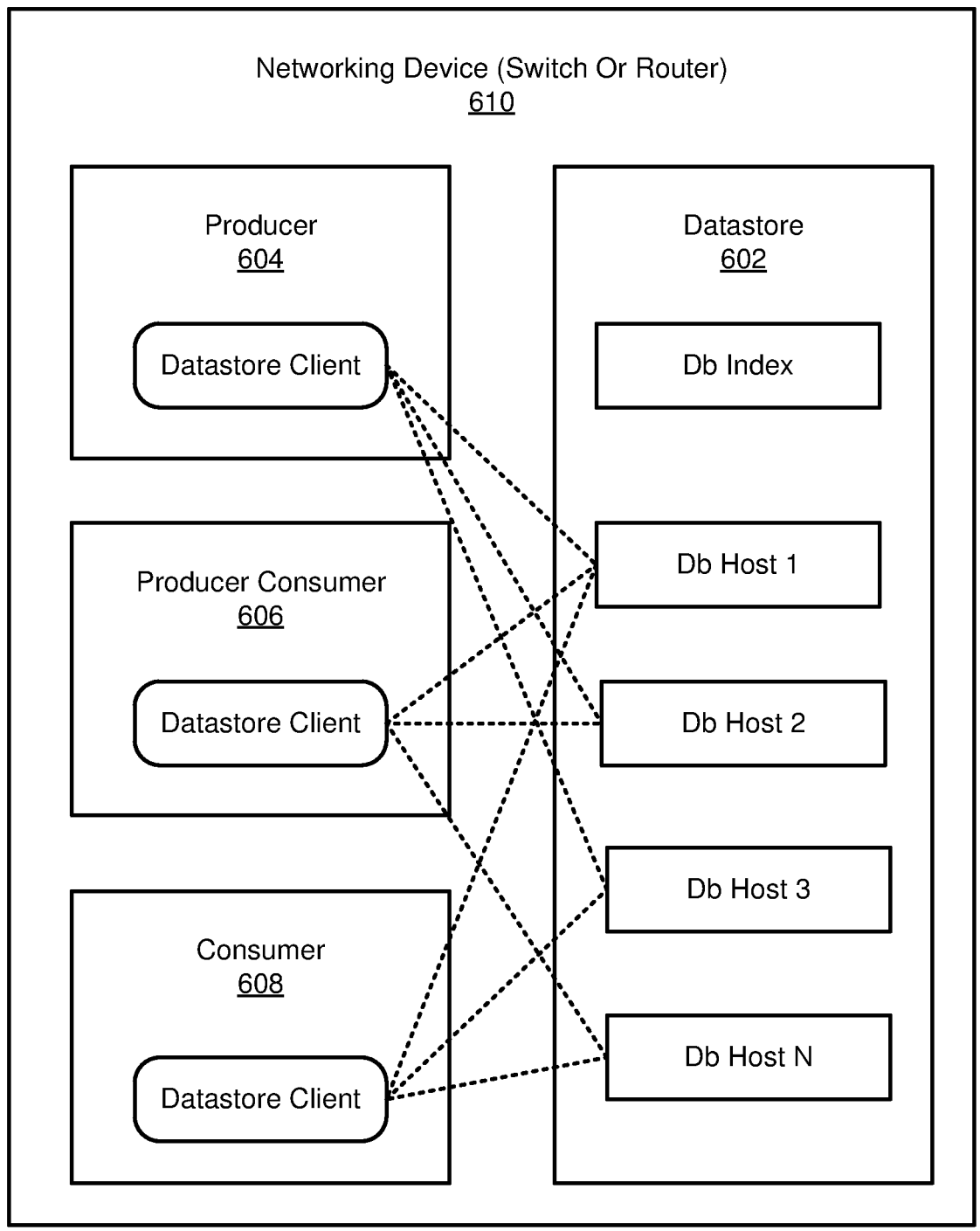
FIG. 6 is a schematic diagram of communications facilitated by a networking device.

FIG. 6 is a schematic diagram of communications facilitated by a networking device 610. The networking device 610 may be a spine node operating as a router or switch in the example illustrated in FIGS. 2-5. In an embodiment, there is a datastore 602 local to the networking device that stores pertinent information for the system. The datastore 602 may be a database storing best path information for one or more routers or switches. The datastore 602 may further store system state information such as CPU utilization, temperature, fan speed, and state information for peripherals such as LEDs or other devices. The datastore 602 may store a variety of information that may be useful to a monitoring agent. The information in the datastore 602 can be streamed out to another controller or device that could want such information. The datastore 602 may include a database index and may include multiple hosts. Each of the multiple hosts may include a processor and cache memory. In the example embodiment shown in FIG. 6, the datastore 602 includes a database host 1, a database host 2, a database host 3, and so on thru database host n.

Figure 7:
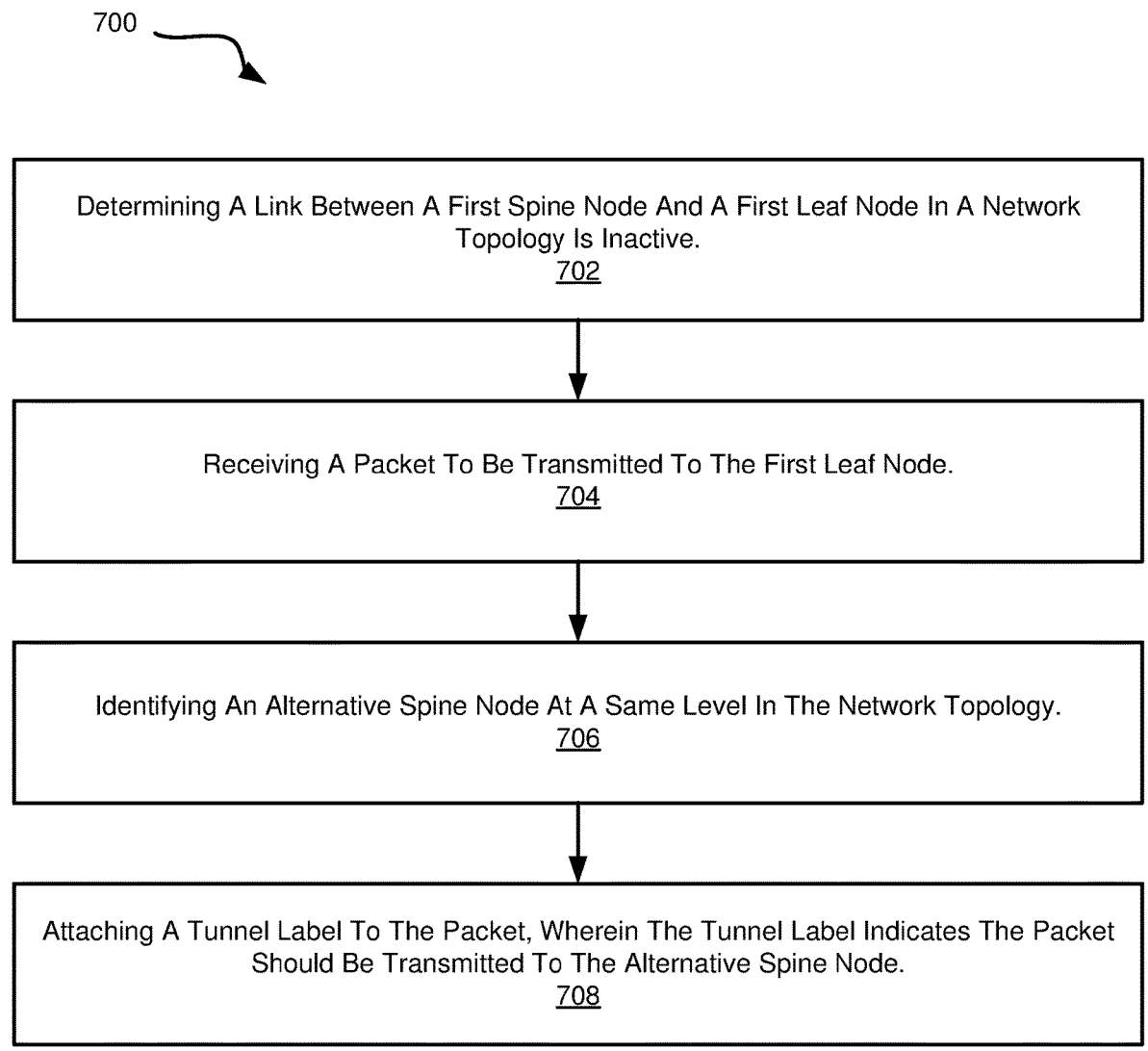
FIG. 7 is a schematic flow chart diagram of a method for routing a data packet in a networking environment.

FIG. 7 is a schematic block diagram of a method 700 for rerouting a packet within a network topology due to a link being broken within the network topology. The method 700 may be implemented in a leaf-spine network with a Clos architecture as discussed herein. The method 700 may be implemented by a spine node such as a switch or router, or by any other suitable computing device.

The method 700 begins and a computing device determines at 702 that a link between a first spine node and a first leaf node in a network topology is inactive. The method 700 continues and a computing device receives at 704 a packet to be transmitted to the first leaf node. The method 700 continues and a computing device identifies at 706 an alternative spine node at a same level in the network topology. The method 700 continues and a computing device attaches at 708 a tunnel label to the packet, wherein the tunnel label indicates the packet should be transmitted to the alternative spine node.

Figure 8:
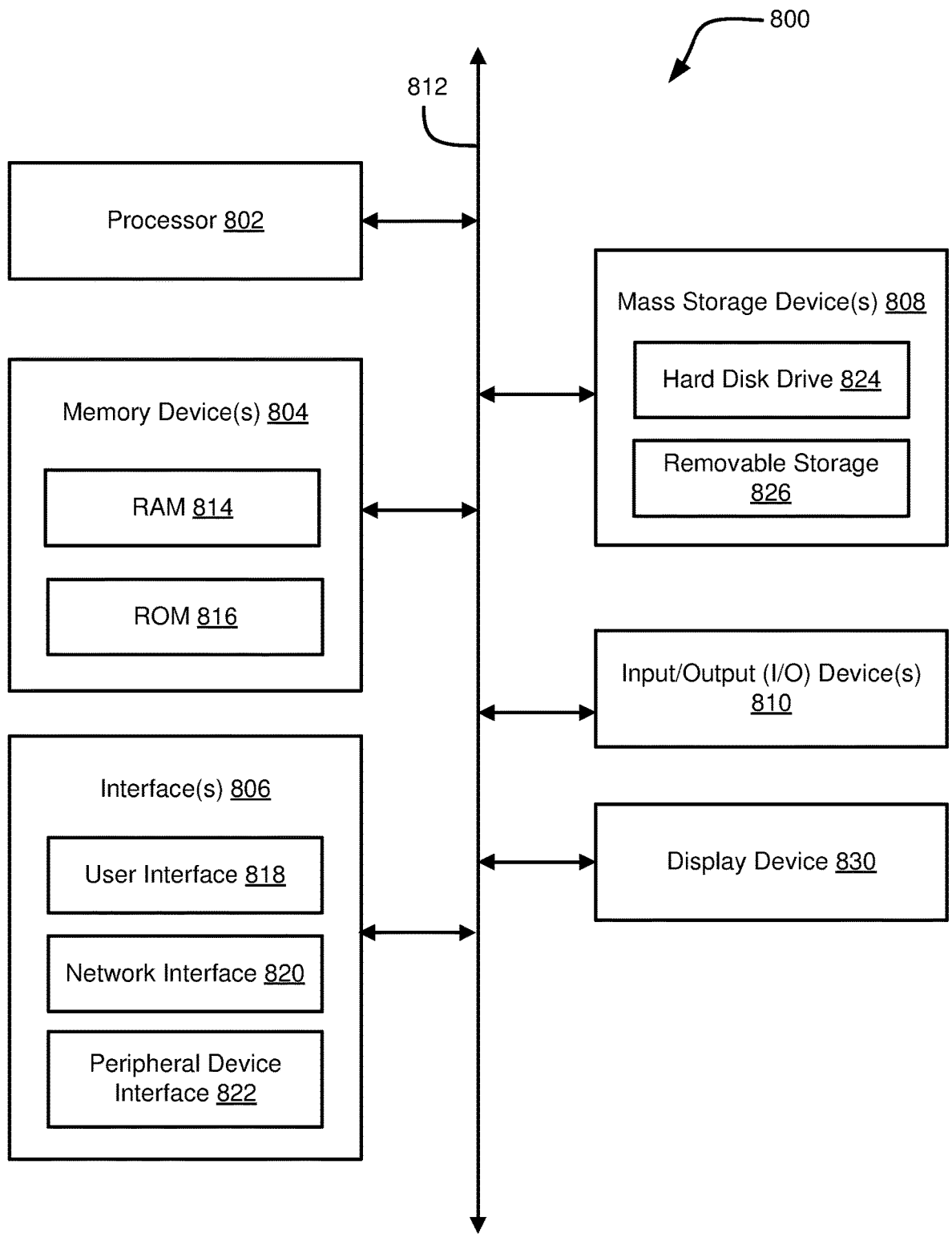
FIG. 8 is a schematic diagram illustrating components of an example computing device.

Referring now to FIG. 8, a block diagram of an example computing device 800 is illustrated. Computing device 800 may be used to perform various procedures, such as those discussed herein. In one embodiment, the computing device 800 can function to perform the functions of the spine nodes or leaf nodes and can execute one or more application programs. Computing device 800 can be any of a wide variety of computing devices, such as a desktop computer, in-dash computer, vehicle control system, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/output (I/O) device(s) 802, and a display device 830 all of which are coupled to a bus 812. Processor (s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

Input/output (I/O) device(s) 802 include various devices that allow data and/or other information to be input to or retrieved from computing device 800. Example I/O device(s) 802 include cursor control devices, keyboards, keypads, microphones, monitors or other display devices, speakers, printers, network interface cards, modems, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 may include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, or any suitable user interface now known to those of ordinary skill in the field, or later discovered), keyboards, and the like.

Bus 812 allows processor(s) 802, memory device(s) 804, interface(s) 806, mass storage device(s) 808, and I/O device(s) 802 to communicate with one another, as well as other devices or components coupled to bus 812. Bus 812 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 800 and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents. Examples The following examples pertain to further embodiments.

Example 1 is a system. The system includes a network topology comprising a plurality of spine nodes and a plurality of leaf nodes, wherein a link between a first spine node and a first leaf node is inactive. The first spine node includes one or more processors configurable to execute instructions stored in non-transitory computer readable storage media. The instructions include receiving a packet to be transmitted to the first leaf node. The instructions include identifying an alternative spine node at a same level in the network topology. The instructions include attaching a tunnel label to the packet, wherein the tunnel label indicates the packet should be transmitted to the alternative spine node.

Example 2 is a system as in Example 1, wherein the instructions further comprise identifying the link between the first spine node and the first leaf node is inactive, and wherein identifying the alternative spine node at the same level comprises analyzing a redundancy group for the first spine node.

Example 3 is a system as in any of Examples 1-2, wherein the instructions further comprise advertising a local loopback route to other spine nodes within the same level in the network topology.

Example 4 is a system as in any of Examples 1-3, wherein the instructions further comprise populating a redundancy group comprising one or more alternative spine nodes at the same level in the network topology that have an active link to the first leaf node.

Example 5 is a system as in any of Examples 1-4, wherein the instructions are such that the tunnel label comprises a route pointing to the alternative spine node.

Example 6 is a system as in any of Examples 1-5, wherein the instructions are such that the tunnel label further comprises an indication that the route is not a best path for reaching the first leaf node.

Example 7 is a system as in any of Examples 1-6, wherein the instructions further comprise: identifying the link between the first spine node and the first leaf node is no longer inactive; and in response to identifying the link is no longer inactive, transmitting a new packet destined for the first leaf node directly to the first leaf node in lieu of attaching the tunnel label to the new packet.

Example 8 is a system as in any of Examples 1-7, wherein the network topology is a Clos network with a leaf-spine architecture.

Example 9 is a system as in any of Examples 1-8, wherein the network topology comprises a plurality of layers each comprising spine nodes and leaf nodes, and wherein the instructions are such that identifying the alternative spine node comprises identifying one or more other spine nodes at the same level in the network topology as the first spine node that have an active link to the first leaf node.

Example 10 is a system as in any of Examples 1-9, wherein the instructions further comprise identifying which other spine nodes in the same level have an active link to the first leaf node based on advertisements received from the other spine nodes in the same level.

Example 11 is one or more processors configurable to execute instructions stored in non-transitory computer readable storage media. The instructions include determining a link between a first spine node and a first leaf node in a network topology is inactive. The instructions include receiving a packet to be transmitted to the first leaf node. The instructions include identifying an alternative spine node at a same level in the network topology. The instructions include attaching a tunnel label to the packet, wherein the tunnel label indicates the packet should be transmitted to the alternative spine node.

Example 12 is one or more processors as in Example 11, wherein the instructions are such that identifying the alternative spine node at the same level comprises analyzing a redundancy group for the first spine node.

Example 13 is one or more processors as in any of Examples 11-12, wherein the instructions further comprise advertising a local loopback route to other spine nodes within the same level in the network topology.

Example 14 is one or more processors as in any of Examples 11-13, wherein the instructions further comprise populating a redundancy group comprising one or more alternative spine nodes at the same level in the network topology that have an active link to the first leaf node.

Example 15 is one or more processors as in any of Examples 11-14, wherein the instructions are such that the tunnel label comprises a route pointing to the alternative spine node and an indication that the route is not a best path for reaching the first leaf node.

Example 16 is a method. The method includes determining a link between a first spine node and a first leaf node in a network topology is inactive. The method includes receiving a packet to be transmitted to the first leaf node. The method includes identifying an alternative spine node at a same level in the network topology. The method includes attaching a tunnel label to the packet, wherein the tunnel label indicates the packet should be transmitted to the alternative spine node.

Example 17 is a method as in Example 16, further comprising identifying the alternative spine node at the same level comprises analyzing a redundancy group for the first spine node.

Example 18 is a method as in any of Examples 16-17, further comprising advertising a local loopback route to other spine nodes within the same level in the network topology.

Example 19 is a method as in any of Examples 16-18, further comprising populating a redundancy group comprising one or more alternative spine nodes at the same level in the network topology that have an active link to the first leaf node.

Example 20 is a method as in any of Examples 16-19, wherein the tunnel label comprises a route pointing to the alternative spine node and an indication that the route is not a best path for reaching the first leaf node.

Example 21 is a means for performing the instructions or method steps in any of Examples 1-20.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
    a network topology comprising a plurality of spine nodes and a plurality of leaf nodes, wherein a link between a first spine node of the plurality of spine nodes and a first leaf node of the plurality of leaf nodes is inactive;
    the first spine node comprising one or more processors configurable to execute instructions stored in non-transitory computer readable storage media, the instructions comprising:
        receiving a packet from a second leaf node of the plurality of leaf nodes to be transmitted to the first leaf node, wherein the packet comprises a first prefix associated with the first leaf node;
        advertising a local loopback route to one or more other spine nodes of the plurality of spine nodes other than the first spine node within a same level in the network topology;
        identifying an alternative spine node of the plurality of spine nodes at the same level in the network topology as the first spine node;
        generating a tunnel label for the packet based on the advertised loopback route, wherein the tunnel label indicates the packet should be transmitted to the alternative spine node and further indicates that a route through the alternative spine node is not a best path from the second leaf node to the first leaf node;
attaching the tunnel label to the packet; and
returning the packet including the tunnel label to the second leaf node for the second leaf node to forward the packet including the tunnel label to the alternative spine node in lieu of performing a lookup on the first prefix.

2. The system of claim 1, wherein the instructions further comprise determining the link between the first spine node and the first leaf node is inactive, and wherein identifying the alternative spine node at the same level in the network topology as the first spine node comprises analyzing a redundancy group for the first spine node.

3. The system of claim 1, wherein the instructions further comprise populating a redundancy group with the one or more other spine nodes of the plurality of spine nodes other than the first spine node at the same level in the network topology that have an active link to the first leaf node.

4. The system of claim 1, wherein the instructions are such that the tunnel label comprises a route pointing to the alternative spine node for delivering the packet to the first leaf node.

5. The system of claim 4, wherein the instructions are such that the tunnel label indicates an alternative route for the packet to arrive at the first leaf node, wherein the tunnel label is read by the second leaf node in lieu of the second leaf node performing the lookup on the first prefix associated with the first leaf node.

6. The system of claim 1, wherein the instructions further comprise:
determining the link between the first spine node and the first leaf node is no longer inactive; and
in response to determining the link is no longer inactive, transmitting a new packet destined for the first leaf node directly to the first leaf node in lieu of attaching the tunnel label to the new packet.

7. The system of claim 1, wherein the network topology is a Clos network with a leaf-spine architecture.

8. The system of claim 1, wherein the network topology comprises a plurality of layers, and wherein the instructions are such that identifying the alternative spine node comprises identifying the one or more other spine nodes of the plurality of spine nodes other than the first spine node at the same level in the network topology that have an active link to the first leaf node.

9. The system of claim 8, wherein the instructions further comprise identifying the one or more other spine nodes of the plurality of spine nodes other than the first spine node at the same level of the network topology that have an active link to the first leaf node based on advertisements received from the plurality of spine nodes at the same level in the network topology.

10. Non-transitory computer readable storage media storing instructions for execution by one or more processors, the instructions comprising:
determining, by a first spine node in a network topology, that a link between the first spine node and a first leaf node in the network topology is inactive;
receiving a packet to be transmitted from a second leaf node to the first leaf node, wherein the packet comprises a first prefix associated with the first leaf node;
advertising a local loopback route to one or more other spine nodes of the plurality of spine nodes other than the first spine node within a same level in the network topology;
identifying a backup tunnel to an alternative spine node at the same level in the network topology as the first spine node, wherein the alternative spine node is in a redundancy group associated with the first spine node;
generating a tunnel label for the packet based on the advertised loopback route, wherein the tunnel label indicates the packet should be transmitted to the alternative spine node and further indicates that a route through the alternative spine node is not a best path from the second leaf node to the first leaf node;
attaching the tunnel label to the packet; and
returning the packet including the tunnel label to the second leaf node to direct the second leaf node to provide the packet including the tunnel label to the alternative spine node in lieu of performing a lookup on the first prefix.

11. The non-transitory computer readable storage media of claim 10, wherein the instructions are such that identifying the alternative spine node at the same level in the network topology comprises analyzing the redundancy group associated with the first spine node.

12. The non-transitory computer readable storage media of claim 10, wherein the instructions further comprise populating the redundancy group with the one or more other spine nodes of the plurality of spine nodes other than the first spine node at the same level in the network topology that have an active link to the first leaf node.

13. The non-transitory computer readable storage media of claim 10, wherein the instructions are such that the tunnel label indicates an alternative route for the packet to arrive at the first leaf node, wherein the tunnel label is read by the second leaf node in lieu of the second leaf node performing the lookup on the first prefix associated with the first leaf node.

14. A computer-implemented method performed by an apparatus including a first spine node in a network topology, the computer-implemented method comprising:
determining a link between the first spine node and a first leaf node in the network topology is inactive;
receiving a packet to be transmitted from a second leaf node to the first leaf node, wherein the packet comprises a first prefix associated with the first leaf node;
advertising a local loopback route to one or more other spine nodes of the plurality of spine nodes other than the first spine node within a same level in the network topology;
identifying a backup tunnel to an alternative spine node at the same level in the network topology as the first spine node, wherein the alternative spine node is in a redundancy group associated with the first spine node;
generating a tunnel label for the packet based on the advertised loopback route, wherein the tunnel label indicates the packet should be transmitted to the alternative spine node and further indicates that a route through the alternative spine node is not a best path from the second leaf node to the first leaf node;
attaching the tunnel label to the packet; and
providing the packet including the tunnel label to the second leaf node to direct the second leaf node to provide the packet including the tunnel label to the alternative spine node in lieu of performing a lookup on the first prefix.

15. The computer-implemented method of claim 14, wherein identifying the alternative spine node at the same level in the network topology comprises analyzing the redundancy group associated with the first spine node.

16. The computer-implemented method of claim 14, further comprising populating the redundancy group with the one or more other spine nodes of the plurality of spine nodes other than the first spine node at the same level in the network topology that have an active link to the first leaf node.

17. The computer-implemented method of claim 14, wherein the tunnel label indicates an alternative route for the packet to arrive at the first leaf node, wherein the tunnel label is read by the second leaf node in lieu of the second leaf node performing the lookup on the first prefix associated with the first leaf node.

* * * * *